(12) United States Patent
Coles et al.

(10) Patent No.: US 6,467,725 B1
(45) Date of Patent: Oct. 22, 2002

(54) ELECTRICAL GENERATOR AN AERO-ENGINE INCLUDING SUCH A GENERATOR, AND AN AIRCRAFT INCLUDING SUCH A GENERATOR

(75) Inventors: Jeffrey Ronald Coles, Solihull; Marc Holme, Kenilworth; James Patrick Doyle, Hemel Hempstead, all of (GB)

(73) Assignee: Lucas Industries Limited, London (GB)

( * ) Notice: Subject to any disclaimer, the term of this patent is extended or adjusted under 35 U.S.C. 154(b) by 0 days.

(21) Appl. No.: 09/564,926

(22) Filed: May 4, 2000

(30) Foreign Application Priority Data

May 5, 1999 (GB) ................................................. 9910393

(51) Int. Cl.$^7$ ............................................... F02C 1/06
(52) U.S. Cl. ..................................... 244/58; 60/39.163
(58) Field of Search ............................... 244/53 R, 58, 244/60, 62; 60/39.161, 39.163, 39.07, 39.33, 39.141, 396; 415/123

(56) References Cited

U.S. PATENT DOCUMENTS

| | | | | |
|---|---|---|---|---|
| 4,862,009 A | * | 8/1989 | King ............................ | 290/31 |
| 4,927,329 A | * | 5/1990 | Kliman et al. ............... | 416/127 |
| 5,309,029 A | * | 5/1994 | Gregory et al. ............... | 244/58 |
| 5,523,635 A | * | 6/1996 | Ferreira et al. ............... | 310/71 |
| 5,606,247 A | * | 2/1997 | Sutrina ......................... | 322/50 |
| 5,694,765 A | * | 12/1997 | Hield et al. ............... | 60/39.163 |
| 5,898,246 A | * | 4/1999 | Hoffman ..................... | 310/168 |
| 6,020,711 A | * | 2/2000 | Rubertus et al. ............ | 318/701 |
| 6,252,331 B1 | * | 6/2001 | Mildice et al. .............. | 310/263 |

FOREIGN PATENT DOCUMENTS

| | | |
|---|---|---|
| EP | 0798454 | 10/1997 |
| EP | 0659234 | 12/1997 |
| GB | 2216603 | 10/1989 |
| WO | 03/06007 | 4/1993 |

* cited by examiner

Primary Examiner—Galen L. Barefoot
(74) Attorney, Agent, or Firm—Baker & McKenzie

(57) ABSTRACT

An aero-engine is provided with an integrated switched reluctance generator permanently connected to the low speed spool of the engine such that "windmilling" of the engine enables the generator to be turned if the engine suffers a flame out. The generator is driven by a step up gearbox so as to provide reasonable electrical output, say 25 kW, during flameout whilst keeping the generator weight down.

17 Claims, 5 Drawing Sheets

ELECTRICAL GENERATOR AN AERO-ENGINE INCLUDING SUCH A GENERATOR, AND AN AIRCRAFT INCLUDING SUCH A GENERATOR

The present invention relates to an aircraft generator, and in particular to a generator for supplying electrical power to an aircraft when one or more engines thereof has lost propulsive power, or there has been a failure of the main electrical power system.

Aircraft electrical power requirements have increased over the years. This trend is expected to continue as the number of electrical devices, and electrically operated loads increase within aircraft. It is expected that flight control surfaces will increasingly be driven directly by electrical devices, or indirectly, wherein an electrical device is used to provide a supply of hydraulic pressure which may then be used by hydraulic actuators to operate flight control surfaces. With this greater dependence on electrical power, it is becoming more important to ensure that there is an electrical supply available at all times that the aircraft is in service, the main concern is the loss of electrical power in flight in the event of a failure of combustion in the aircraft engines. Such total "flame-out" conditions have been known to occur as a result of air turbulence or flying through airborne debris, such as volcanic dust.

Traditionally emergency electrical power in the event of engine failure has been provided by a ram air turbine, RAT, which comprises an electrical generator equipped with a propeller. The RAT is normally stored within the fuselage of an engine and provides no output. However, in emergency conditions, the RAT may be deployed by causing an arm to extend the RAT into the air stream surrounding the aircraft. This flow of air causes the propeller of the RAT to rotate thereby generating electrical power.

It is predicted that it will soon be necessary to provide two RATs on each aircraft in order to ensure sufficient power is available in the event of total engine flame out. This is expected to incur a weight penalty in excess of 250 kg for the RATs plus associated airframe reinforcements.

There are many problems associated with RAT operation. The device itself is a relatively heavy piece of equipment which is carried at all times and which is very rarely deployed, thus it involves a fuel penalty on every flight. Furthermore, the aircraft structure must also be reinforced in the region of the RAT mounting in order to ensure that it can stand the loading experienced in the event that the RAT is deployed. Furthermore, because the RAT is operated only very occasionally and it is not regularly tested for functionality, faults may remain latent for some considerable period of time before being detected. It should be noted that satisfactory operation and deployment of a RAT is not always achieved in practice. It would therefore be advantageous to dispense with the RAT completely.

It is known that, in a multistage high bypass gas turbine engine, the low pressure shaft (LP) or low speed spool which drives the low pressure compressor and the bypass fan will continue to rotate in the event of engine failure because the bypass fan is caused to rotate due to the airflow resulting from the motion of the aircraft as it glides to earth. This is known as the "windmill" effect. The energy of the fan could be extracted by a generator connected to the low pressure shaft which could then supply electrical power to the aircraft during periods of flame-out.

GB 2216603 discloses a gas turbine in which the low speed spool is coupled to an emergency generator via a coupling unit in the event of loss of propulsive drive of the engine. The power take off from the low speed spool may be applied to a gear box which drives an hydraulic pump and an electrical generator. Thus the connection between the low speed spool and the generator is broken when the engine is functioning.

WO93/06007 discloses an arrangement in which the down stream end of the low speed spool is connected to a first gearbox which has an output shaft 26 which extends perpendicularly to the spool and into the interior of the engine pylon. The shaft engages with a second gear box which has various engine accessories coupled to it, such as the main engine fuel pump, a hydraulic pump and one or more electrical generators. This document discloses that the ram air turbine can be dispensed with since power in the event of flame-out conditions can be derived from the windmilling of the bypass fan.

EP 0798454 discloses a multi-spool aero engine in which each of the spools independently and directly drive an electrical generator. The primary source of electrical power is an electric motor/generator positioned within the down stream bearing support structure at the down stream end of the innermost engine shaft. This document goes on to describe that the advantage of this configuration is the elimination of the main engine gearbox and two electrical generators driven by that gearbox. This document also goes on to disclose that the bearings for the shaft may be electromagnetic bearings and that "electricity generated by the bearing 38 constitutes the primary source of electricity for the aircraft upon which the engine 37 is mounted". In order for the magnetic bearing to function as a generator, the magnetic bearing must be directly connected to the shaft, that is there is no intermediate gearbox provided.

EP 0659234 relates to an arrangement in which motor generators are connected to at least two of the engine spools and power transfer can be provided between them. Inductive electrical machines are described as being connected to the low pressure spool via gearing, or alternatively a switched reluctance machine may be provided such that the rotor of the switched reluctance machine is an integral part of the engine shaft, as described in column 10 lines 45 to 50. Thus the switched reluctance machine is directly coupled to the engine shaft.

Although these documents disclose the provision of emergency power by utilising the windmilling of the engine, and two of them disclose providing generators within the structure of the engine itself, none of these documents addresses the issue of obtaining a reasonable amount of power from the generator under the windmilling conditions. The amount of power required should be sufficient to power essential systems until the aircraft descends to an altitude where the auxiliary power unit can be started to initiate an engine restart sequence, and preferably to allow flight control surfaces to be actuated, either directly from an electrical power source or indirectly via an intermediate load transfer system, such as an hydraulic circuit.

According to a first aspect of the present invention, there is provided an electrical generator for use with a gas turbine engine having a low speed spool, comprising a generator driven from a low speed spool, and in which the generator is a switched reluctance generator coupled to the low speed spool via a step up gearbox.

It is thus possible to provide an electrical generator which, by virtue of the step up gearbox, provides a greater electrical output during windmilling conditions of the engine than could be obtained from a similarly sized direct coupled generator.

The maximum available output from a switched reluctance generator is, to a fair approximation, directly related to speed of rotation the mass of the magnetic material forming the rotor and stator of the generator. The step up ratio of the gearbox can be traded against weight of the generator to select a predetermined power output for a given rate of rotation of the low speed spool corresponding to windmilling. Preferably the generator should provide in excess of 10 kW during windmilling, and advantageously should provide around 25 kW or more. However, the step up ratio is limited by the requirement that the generator should still be within safe operating speeds when the low speed spool of the aircraft engine has reached its maximum operating speed. Typically the speed of the low speed spool will vary between 200 and 250 rpm for windmilling and 3000 rpm or so as its maximum operating speed. In an embodiment of the present invention, the gearbox has a step up ratio of 12:1, such that the generator has a rotation rate of around 2400 to 3000 rpm when the engine is windmilling. This enables a generator weighing only approximately 20 kg to produce around 25 kW of power.

The use of a step up gearbox does have the disadvantage of increasing the maximum rotational rate of the generator. In the case of a step up gearbox of 12:1, the maximum rotation rate of the generator is increased to 36,000 rpm or so. It is possible to disconnect the drive to the generator, although this itself has safety implications since the coupling may inadvertently disconnect, or connect.

Preferably the generator is continuously coupled to the low speed spool via the step up gearbox.

In order to be an electrically efficient machine at these high rotational rates, it is desirable that the rotor has a core of thin laminates wherein each laminate is preferably less than 0.5 mm thick. Advantageously the rotor laminate pack is held under compressive load, for example by through bolts. Some of the laminates may be modified so as to define retaining means extending into the inter pole gap between the poles of the laminate core, such that the retaining means engage the bolts holding the laminate core together and serve to restrain the bolts against deformation due to centrifugal force.

Advantageously the stator is also composed of thin laminates.

According to a second aspect of the present invention, there is provided an aircraft mounted gas turbine engine comprising a low speed spool having a plurality of blades at a first end thereof, such that the blades are turned by air flow passing through the engine when a combustion region of the engine is not operating, and a generator connected to the low speed spool, characterised in that the generator is permanently drivingly connected to the low speed spool via a step up gearbox such that the generator can supply power when the low speed spool is being turned by the airflow passing therethrough, and in which the generator is a switched reluctance generator.

Preferably the generator is mounted within the tail portion of the engine.

Preferably the aircraft further includes at least one controller for controlling switching and excitation of a plurality of stator coils within the switched reluctance generator, the controller further being arranged to maintain the output of the generator at substantially the aircraft's bus voltage. Advantageously, on a multi engine aircraft, each engine is provided with a generator and has an associated generator controller. Each of the generators may then feed directly into an aircraft bus which supplies electrical power to aircraft actuation systems or electro-hydraulic pumps.

According to a third aspect of the present invention, there is provided an aircraft having a plurality of switched reluctance generators, each of which being arranged to deliver power to an aircraft electrical distribution system, in order to supply power to aircraft systems including those for controlling aircraft flight surfaces, wherein the surfaces are directly driven from electrical motors or wherein the flight surfaces are hydraulically operated and the supply of pressurised hydraulic fluid is derived from an electrically driven pump.

According to a further aspect of the present invention, there is provided an aircraft having electrically actuated flight control surfaces and at least one gas turbine engine, and in which the at least one gas turbine engine has a generator permanently drivingly connected to a low speed spool of the engine such that, in the event of flame-out of the at least one engine, the airflow through the engine whilst the aircraft is in flight generates sufficient power to actuate the flight control surfaces.

The flight control surfaces may be linked to an associated control motor via a mechanical linkage, or a motor may be used to drive a pump to supply hydraulic fluid under pressure to hydraulic actuators which in turn actuate the flight control surfaces. It is thus possible to provide an electrically controlled aircraft which can maintain flight control even in the event of complete loss of propulsive power.

The generator may be used only to provide emergency electrical power. In this configuration, the generator will rotate at all times with the low pressure shaft but is only provided with excitation current during engine failure conditions. This simplifies operation of the electrical drive circuits as the drive does not have to be configured to provide excitation at the high operating speeds encountered during normal use. The initial excitation current need only be small and can be provided from a battery or other excitation source eg PM exciter. However, in order to ensure that the emergency generator is capable of operating when required, it may be energised to produce an output during each shut down cycle for the engine. The engine shutdown routine is controlled by a flight management computer which could be arranged to operate the generator as part of the winding down cycle of the engine after each flight. The output of the emergency generator can then be checked against a series of operational parameters and a warning given in the event that the generator fails to operate within the expected range. Alternatively, a confirmation of generator health could be given during each shut down cycle.

Additionally or alternatively, a very low excitation could be provided to the stator windings during all engine operating conditions in order to cause a small monitoring current to be produced. Under such conditions, the generator may have a relatively low output, for example 1 kW or so. This output could then be used to give a continuous, if desired, confirmation of the generator functionality or may be used to flag when a fault condition has occurred.

Given that a multi engine aircraft will carry several emergency generators, redundancy is provided within the generating capability and it is therefore possible that aircraft operation can continue safely after a fault has been detected in one or more of the generators providing that a sufficient number of generators remain operable.

In an alternative mode of operation, the generator may be used continuously at its nominal operating output whilst the aircraft is in use to provide power to the aircraft systems. This does increase the thermal dissipation demands on the generator control electronics and the generator itself, thereby requiring that these components are more robust than would be required if they were to operate in an emergency only mode with or without continuous low power monitoring. However by operating the generator at its nominal full design output, other engine components or aircraft generators may be omitted from the aircraft thereby giving a weight saving.

The present invention will further be described, by way of example, with reference to the accompanying drawings, in which:

FIG. 1 schematically illustrates a typical electrical power system configuration for an aircraft having a ram air turbine and forming part of the state of the art;

FIG. 2 schematically illustrates the electrical configuration for an aircraft having an electrical system constituting an embodiment of the present invention;

FIG. 3 schematically illustrates a section through an aero engine having a gear box and generator constituting an embodiment of the present invention;

Figure 1:
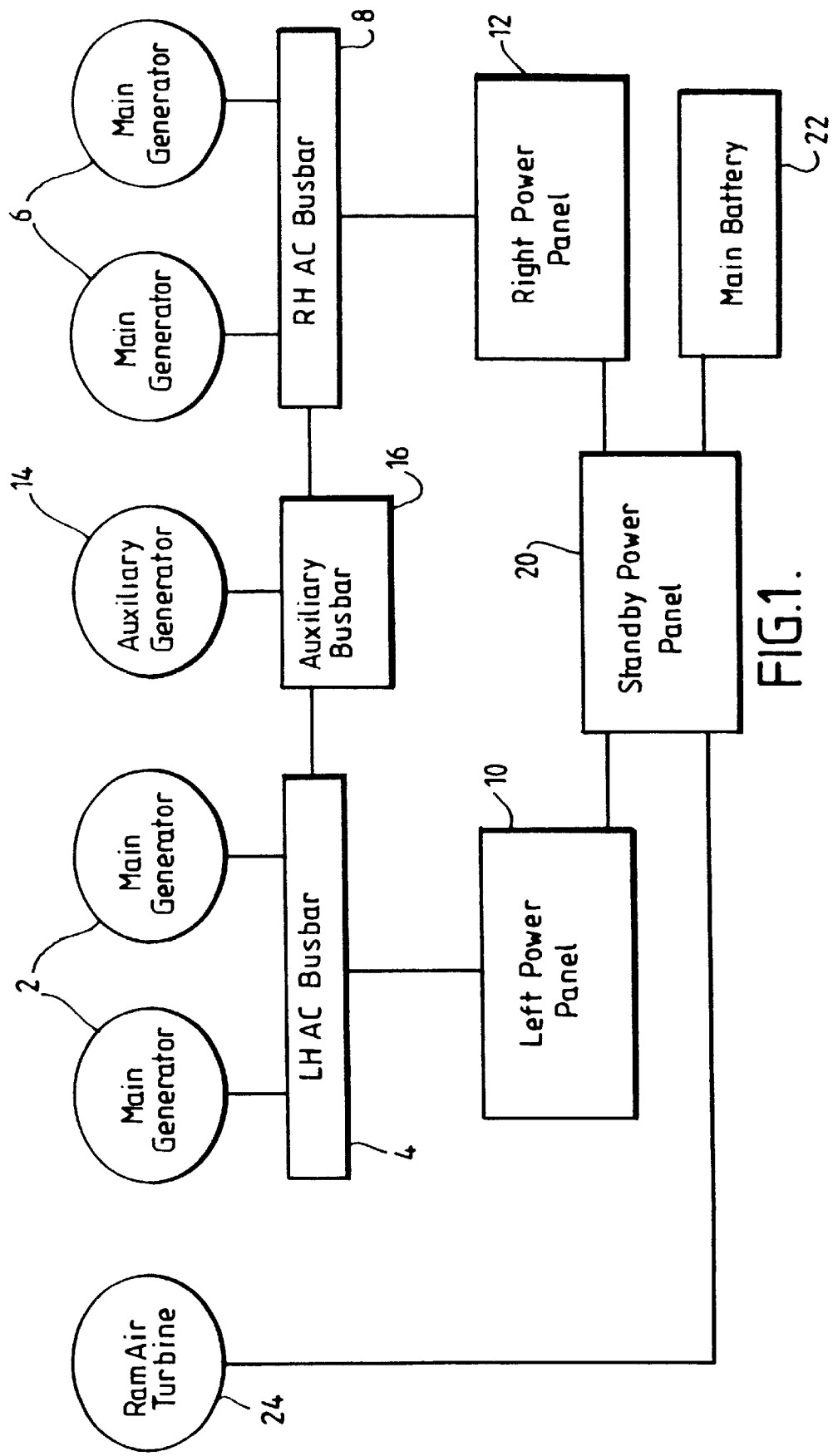

Conventionally, the electrical system of an aircraft is split into left and right hand sides, as shown in FIG. 1. Main generators 2 on the left hand side engines supply power to a left hand AC bus bar 4. Similarly, main generators 6 on the right hand side of the aircraft supply electrical power to a right hand AC bus bar 8. The generators are driven via power take-off shafts from the high speed spools of the engines. Switching of the power in the bus bar to various aircraft systems is controlled via left hand and right hand power panels 10 and 12, respectively. An auxiliary generator 14, usually mounted at the base of the tail fin, provides power to an auxiliary bus bar 16 which can be selectively connected to the left hand and right hand bus bars 4 and 8. The reasoning behind this distribution system is to enable one half of the aircraft to be isolated from the other. This is advantageous since a fault on one of the electrical generators may cause it to take the other generators on the same bus bar into a fault mode also. The left and right power panels 10 and 12 are selectively connectable to a standby power system via the standby power panel 20. The standby power panel 20 allows power from a battery 22 or from a ram air turbine 24 to be routed to either the left hand or right hand distribution systems within the aircraft. Thus in the event that all engines flame out, electricity from the main battery or from the ram air turbine may be routed to aircraft systems and also to the auxiliary power unit which is a small jet engine having an electric start capability. The auxiliary power unit may then be restarted in order to provide more electrical power to the aircraft systems and also to provide a supply of compressed gas which may then be routed to the main engines in order to operate their pneumatic starter motors in order to continue the engine restart sequence.

Figure 2:
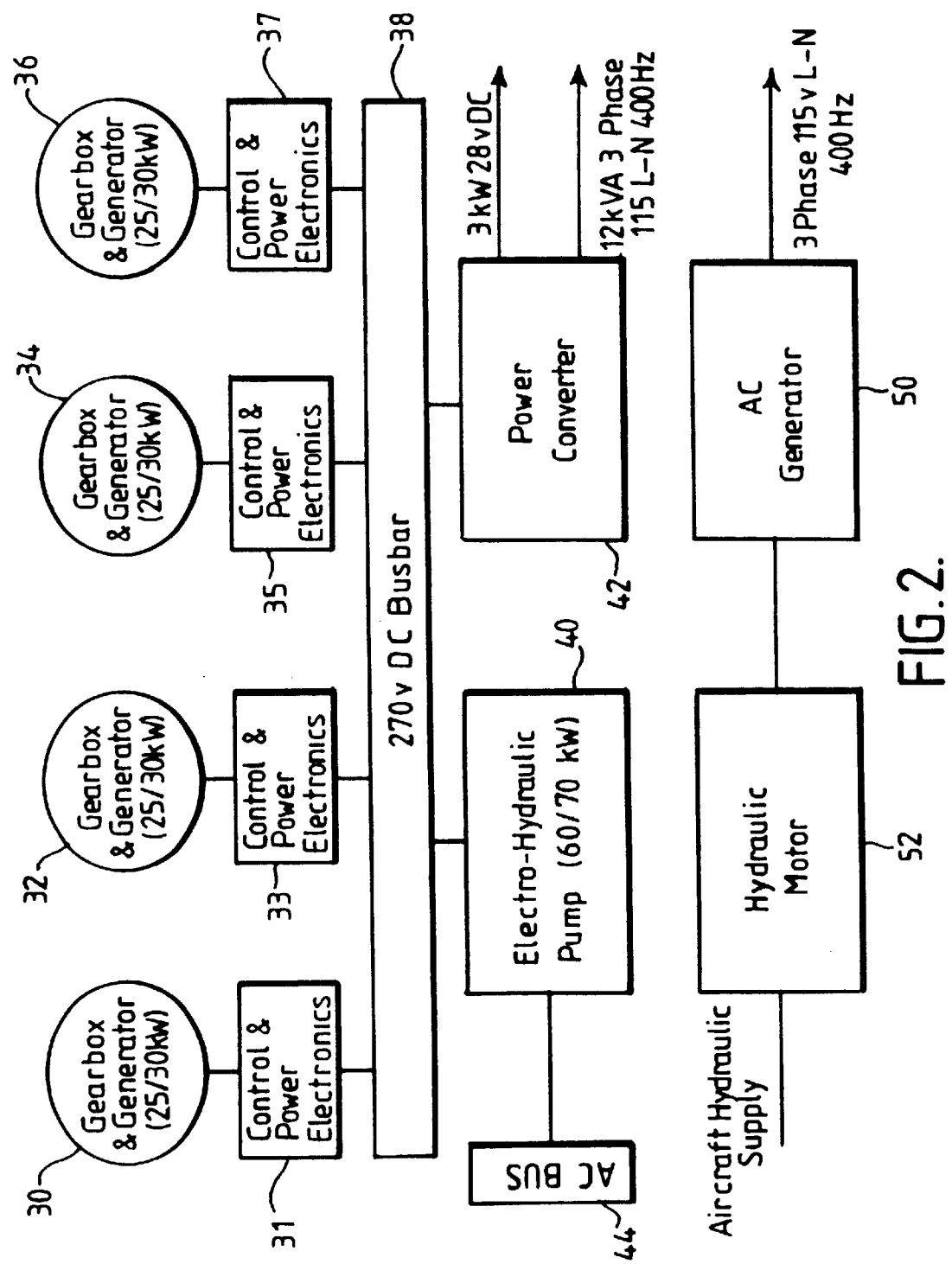

For aircraft having generator systems constituting an embodiment of the present invention, the bus bar may be modified and the ram air turbine omitted. FIG. 2 illustrates a distribution arrangement which may be used to supplement the primary distribution system shown in FIG. 1, or, if the generators are used as a primary source of aircraft power, then this distribution arrangement may be used in place of that shown in FIG. 1. The arrangement shown in FIG. 2 relates to a four engine aircraft wherein first and second engines drive first and second gear box and generator assemblies 30 and 32 located on the left hand side of the aircraft. Similarly, third and fourth engines driving third and fourth gear box and generator assemblies 34 and 36 are located on the right hand side of the aircraft. Each generator is a switched reluctance generator in which a toothed rotor co-operates with a toothed stator, and in which there are no electrical connections to the rotor. The control and power electronics associated with each generator is arranged to control the supply of excitation current derived either from the aircraft electrical system or from a source of power generated from within the generator itself (eg a co-axially mounted permanent magnet generator) through a plurality of stator windings as a function of the rotational position of the rotor. This generates an induced magnetic field on the rotor which then cuts the windings on the stator thereby inducing an electrical current. The control strategies for using switched reluctance machines as motors or generators are well described in the art and need not be described in any further detail here. In the event of a generator failure, it can be easily isolated from the electrical system merely by removing the excitation currents to the stator windings. As a consequence, there is no need to separate the electrical bus bar into left and right hand sides as any generator can be isolated from the bus bar via suitable operation of the control and power electronics unit associated with it. Thus each of the generators 30, 32, 34 and 36 feed directly to a single bus bar 38 via their respective control and power electronics unit 31, 33, 35 and 37, respectively. A further advantage gained through the use of a switched reluctance generator is that, in the event of a fault developing in one phase of the generator, the machine may still be operated to provide a reduced power output. This fault tolerant nature makes switched reluctance technology a preferred choice of emergency generator. It will be appreciated that an aircraft fitted with such a system has a minimum generating capacity in the region of 100–120 kW during gliding conditions following a complete engine flame out. This generating capacity is, of course, naturally increased if any one or more of the engines remains alight. The electrical output from the switched reluctance generators and the control electronics is in a direct current form, and this may then be used to drive power converter 40 and 42 to provide 60–70 kW of power to the aircraft AC bus 44 and also to provide power to the aircraft 28 volt DC and 115 volt 400 Hz AC power distribution systems.

For those aircraft where the switched reluctance generators connected to the low speed spool do not form the primary generating capability, additional AC generators 50 may be driven by hydraulic motors 52 which receive pressure from the aircraft hydraulic supplies, which are typically derived by using take off drive shafts from the high pressure spool to operate hydraulic pumps adjacent each engine.

Figure 3:
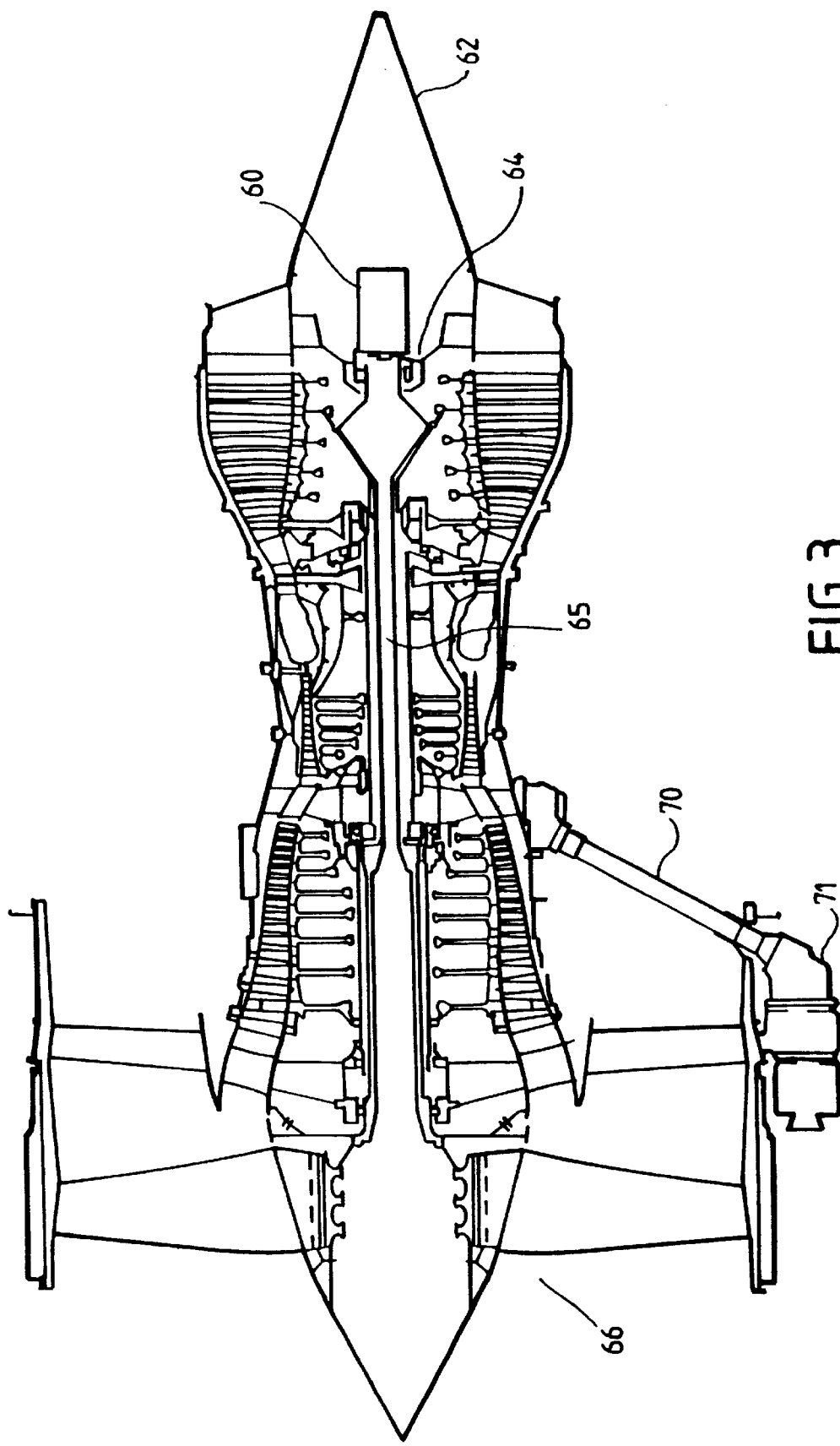

As shown in FIG. 3, the switched reluctance generator and gear box assembly 60 is located in the tail cone 62 of the engine at the rear most end 64 of the low pressure spool 65. The front most end of the low pressure spool is drivingly connected to the bypass fan 66. For simplicity, other aero engine components will not be described since they are well understood by the skilled person in the art. In the configuration shown, a power take off shaft 70 is provided to tap power from the high speed spool in order to provide motor power for AC generators and hydraulic pumps 71.

Figure 4:
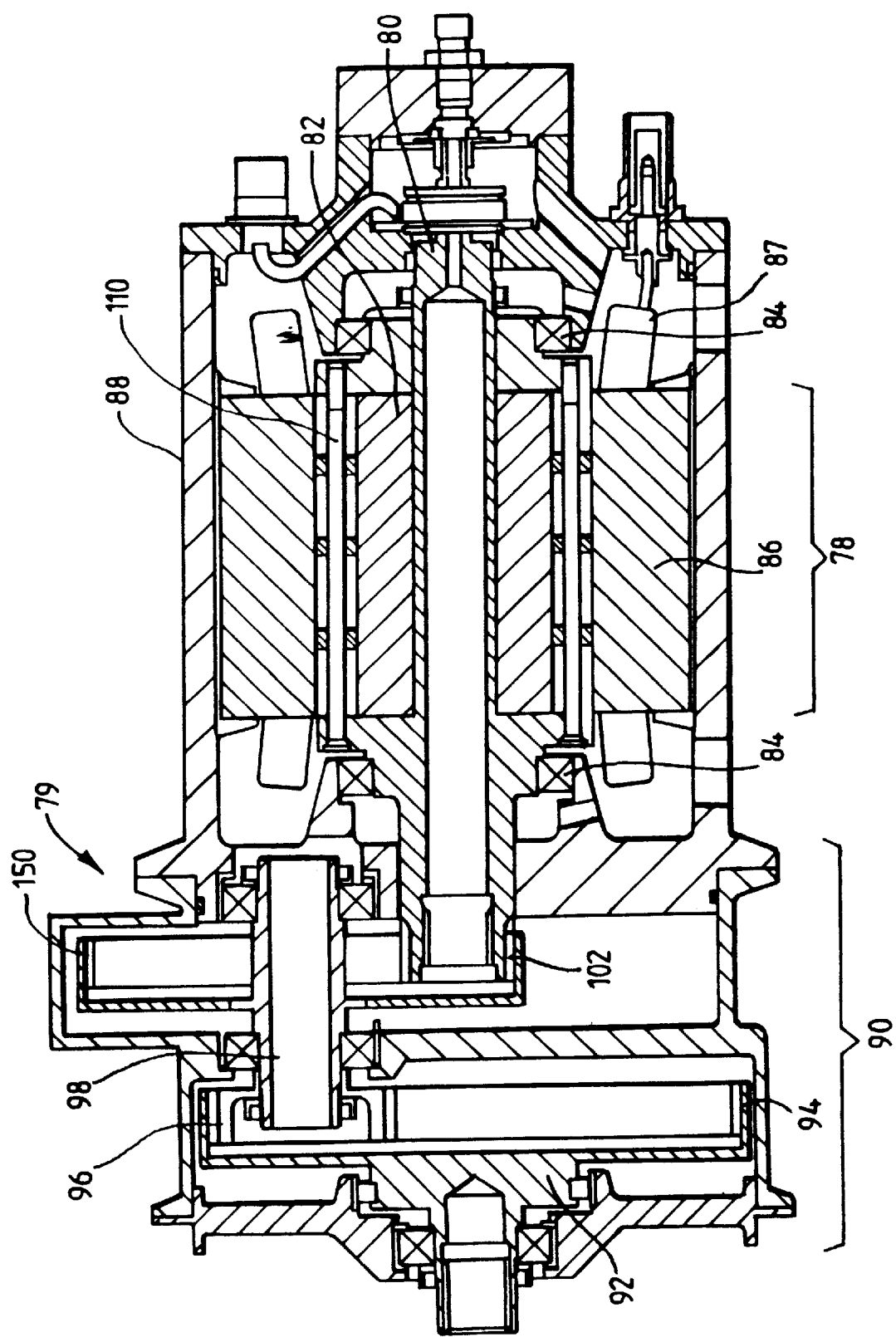
FIG. 4 shows the gearbox and switched reluctance generator in more detail.

FIG. 4 schematically illustrates the switched reluctance generator 78 and step up gear box 79 in more detail. A rotor 80 and lamination stack 82 is rotatably supported by journal bearings 84. A stator 86 comprising a plurality of coils 87 wound round magnetic pole pieces encircles the rotor, and is attached to a generator housing 88. A step up gear box 90 is secured to a first end of the generator housing. An input gear 92 has a splined input portion for engaging the rear most end 64 of the low speed spool of the gas turbine engine. Gear teeth are provided on an inwardly facing portion of a cup shaped element 94 which in turn engages with radially outward facing teeth 96 of an intermediate gear 98 which in turn has a cup shaped portion 100 carrying radially inward facing teeth which engage gear teeth 102 of the rotor 80. In use, rotation of the low speed spool of the engine is stepped up 12 times by the gearbox and transmitted to the rotor. Thus the rotor may be driven at high rotational rates, for example in the region of 36,000 rpm for a typical aero-engine having a maximum low speed spool speed of 3,000 rpm.

In order to cope with the high rotational rates whilst not compromising electrical performance, it is beneficial to modify selected ones of the laminations of the rotor.

Figure 5:
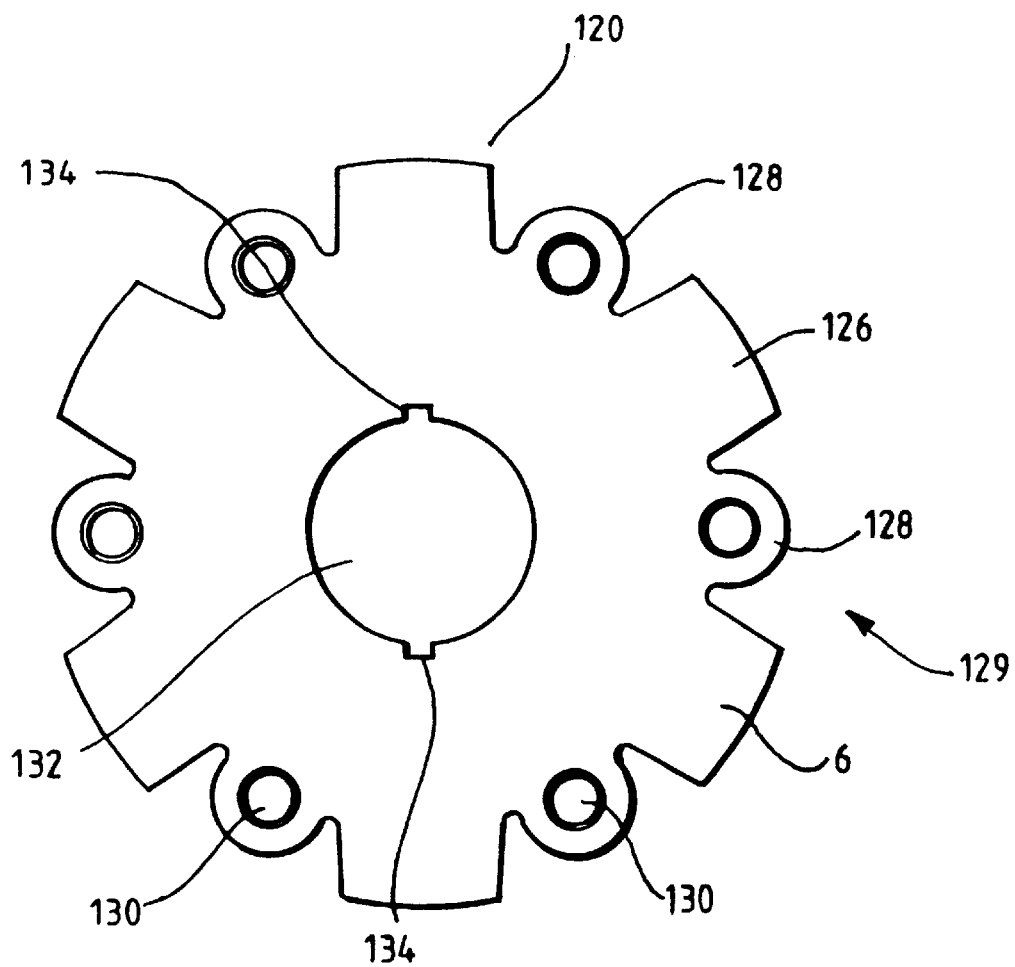
FIG. 5 illustrates a lamination forming part of the rotor of the generator.

FIG. 5 shows an embodiment of a lamination 120 for use in the generator. The lamination 120 comprises a generally circular central portion carrying a plurality of projections 126 spaced around its periphery. The projections 126 form pole pieces in the generator. In order to minimise out of balance forces, the projections are arranged in a regular array exhibiting two or more fold rotational symmetry. Attachment elements 128 in the form of lugs, project from the body of the lamination into the inter-pole spacing 129. The lugs 128 have through passages 130 formed therein in order to accept the passage of fixing elements, which are normally bolts. The passages are completely enclosed within the lugs 128. The lamination is provided with a central aperture 132, sized so as to slidingly engage the rotor shaft of the generator. Locating notches 134 are provided to engage the lamination to the rotor shaft in a predetermined orientation.

Groups of laminations 120 of the type shown in FIG. 5 are provided at regular intervals along the shaft. The groups are surrounded by other laminations of a more conventional design, in that they do not have the attachment elements 128 formed thereon.

The laminations are thin, typically 0.2 mm or so, in order to reduce eddy current losses at high speeds. The best way to form the lamination stack is to bolt the laminations between opposing flanges. The bolts pass through the flanges and the passages 130 in the laminations, and are insulated therefrom by insulating bushes. The lugs 128 serve to hold the bolts against radial deformation resulting from centrifugal forces as the rotor rotates.

It is thus possible to provide a generator capable of generating significant amounts of electrical energy from the windmilling of an aero-engine, and without incurring a significant weight penalty. Furthermore the generator can be regularly tested during each engine start or shut down cycle and may also provide a source of power, either as a primary or backup system during flight.

What is claimed is:

1. An electrical generator for use with a gas turbine engine having a low speed spool, wherein the generator is driven from the low speed spool, in which the generator is a switched reluctance generator permanently coupled to the low speed spool via a step up gear box.

2. An electrical generator as claimed in claim 1, in which the gearbox is selected such that the generator has a rotational rate of around 2400 to 3000 revolutions per minute when the engine is windmilling.

3. An electrical generator as claimed in claim 1, in which the generator is permanently connected to the low speed spool via the step up gearbox.

4. An electrical generator as claimed in claim 1, in which a rotor of the generator has a core of thin laminates held in a stack under compressive load.

5. An electrical generator as claimed in claim 4, in which the stack is held under compressive load by bolts, and that some of the laminates in the stack have retaining means which engage with the bolts and serve to restrain the bolts against deformation due to centrifugal force.

6. An electrical generator as claimed in claim 1, in combination with an aircraft mounted gas turbine engine, further comprising a controller for controlling switching and excitation of stator coils within the generator, and in which the controller is arranged to maintain an output of the generator at substantially the bus voltage of an aircraft bus.

7. An electrical generator as claimed in claim 1, in which the generator is used to provide emergency electrical power.

8. An electrical generator as claimed in claim 6, in which the generator is placed in a generating mode during the engine shutdown cycle in order to check the operation of the generator.

9. An electrical generator as claimed in claim 6, in which the generator is operated continuously whilst the aircraft is in use.

10. An aircraft having a plurality of switched reluctance generators, in which the generators are arranged to deliver power to an aircraft electrical distribution system in order to supply power to aircraft systems including those for controlling aircraft flight surfaces, wherein the flight surfaces are directly driven from electrical motors or wherein the flight surfaces are hydraulically operated and the supply of pressurized hydraulic fluid is derived from an electrically driven pump, and in which at least one of the generators is in combination with a gas turbine engine and is permanently connected via a step up gear box to a low speed spool of said engine such that, in the event of flame out of said engine, the airflow though said engine whilst said aircraft is in flight generates sufficient power to actuate the flight control surfaces.

11. An electrical generator for use with a gas turbine engine of an aircraft, wherein the generator is a switched reluctance generator permanently drivingly coupled to the low speed spool of the gas turbine engine via step up gearbox such that, the generator supplies electrical power for aircraft systems when the gas turbine engine is windmilling.

12. An electrical generator as claimed in claim 11, in which the gearbox is selected such that the generator has a rotational rate of around 2400 to 3000 revolutions per minute when the engine is windmilling.

13. An electrical generator as claimed in claim 11, in which a rotor of the generator has a core of thin laminates held in a stack under compressive load.

14. An electrical generator as claimed in claim 13, in which the stack is held under compressive load by bolts, and that some of the laminates in the stack have retaining means which engage with the bolts and serve to restrain the bolts against deformation due to centrifugal force.

15. An electrical generator as claimed in claim 11, in combination with an aircraft mounted gas turbine engine, further comprising a controller for controlling switching and excitation of stator coils within the generator, and in which the controller is arranged to maintain an output of the generator as substantially the bus voltage of an aircraft bus.

16. An electrical generator as claimed in claim 11, in which the generator is placed in a generating mode during the engine shutdown cycle in order to check the operation of the generator.

17. An electrical generator as claimed in claim 15, in which the generator is operated continuously whilst the aircraft is in use.

* * * * *